United States Patent [19]

Galaj et al.

[11] Patent Number: 4,906,370

[45] Date of Patent: Mar. 6, 1990

[54] TANGENTIAL FILTRATION APPARATUS

[75] Inventors: Stanislas Galaj, Arcueil; Alain Wicker, Paris, both of France

[73] Assignee: Compagnie Generale D'Electricite, Paris, France

[21] Appl. No.: 343,563

[22] Filed: Apr. 27, 1989

[30] Foreign Application Priority Data

Apr. 29, 1988 [FR] France ................. 88 05751

[51] Int. Cl.⁴ ............................................ B01D 13/00
[52] U.S. Cl. .............................. 210/321.67; 210/321.8; 210/321.89
[58] Field of Search ............... 210/634, 641, 644, 649, 210/780, 195.2, 257.2, 297, 321.6, 321.64, 321.67, 321.68, 321.72, 321.79, 321.8, 321.87, 321.88, 321.89, 408

[56] References Cited

U.S. PATENT DOCUMENTS 2,678,133  5/1954  Thayer et al. .................. 210/297
3,821,108  6/1979  Manjikian ...................... 210/408

Primary Examiner—Frank Sever
Attorney, Agent, or Firm—Sughrue, Mion, Zinn, Macpeak & Seas

[57] ABSTRACT

Rotating membrane tangential filtration apparatus with low power consumption is characterized by a direct drive system (10) along the axis of its membrane (5), a sealing system (11, 16) between the residue and filtrate compartments, which system used frictional ceramic parts; the diameter of the filter membrane is small relative to its length, and the filter layer is arranged on its outside surface; it is provided with a system for taking up the slack caused by differential expansion.

8 Claims, 5 Drawing Sheets

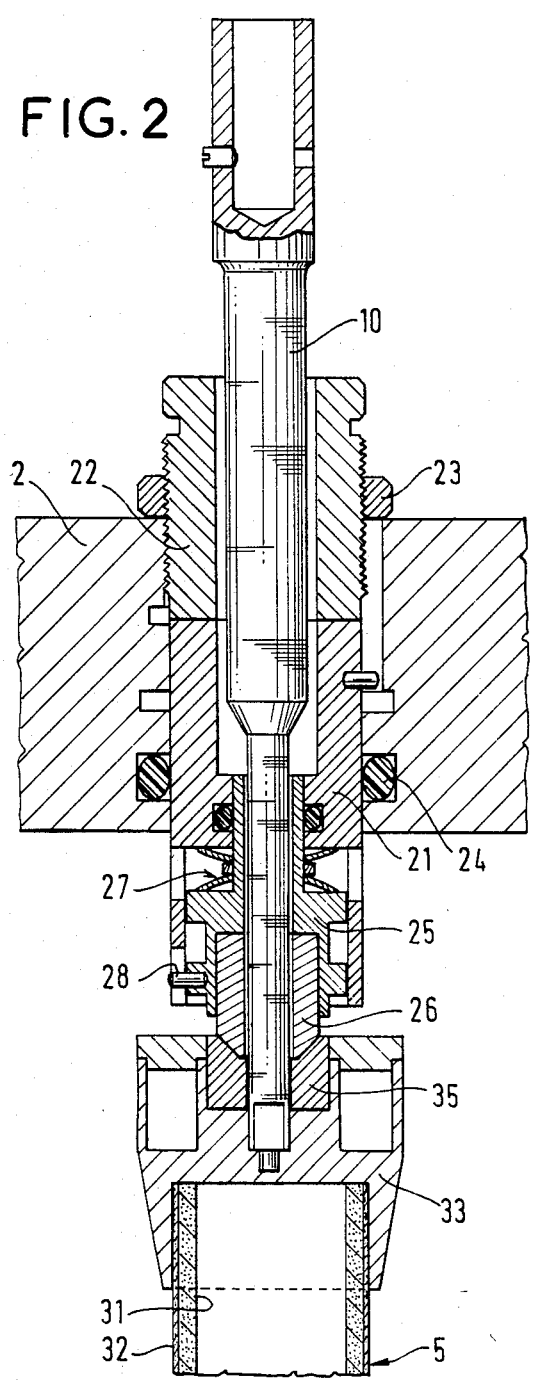
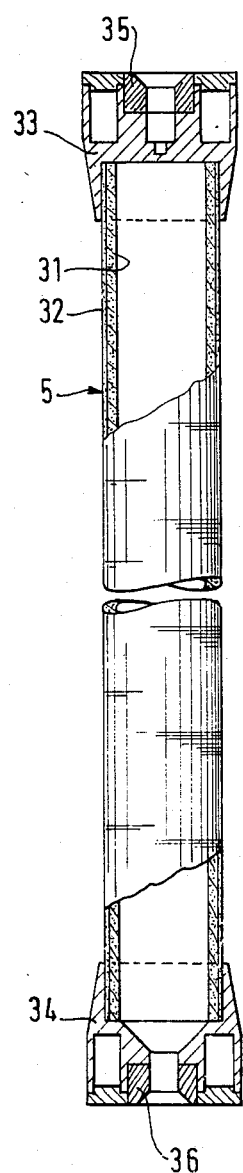
FIG. 2
FIG. 3

TANGENTIAL FILTRATION APPARATUS

The present invention relates to tangential filtration apparatus using a rotating filter membrane in a housing.

European patent application No. 0 112 152 describes blood separation apparatus in which a cylindrical membrane is rotated within its housing to create a shear force; PCT patent application No. 85-04 112 specifies the critical spacing between the said housing and membrane which will cause Taylor vortices to be established along the membrane.

In an article which appeared in Escher Wyss - News, vol. 51/52, 2/1978-1/1979 pp. 21-23, by W. TOBLER and entitled "Dynamic filtration - the engineering concept of the Escher-Wyss pressure filter", a filtration apparatus is disclosed which includes two concentric or eccentric membranes, the inner membrane performing rotary motion; the gap between the membranes is such that Taylor vortices form between them.

In articles by B. Hallström and M. Lopez-Leiva entitled: "Description of a rotating ultrafiltration module" which appeared in "Desalination, 24 (1978) 273-279 Elsevier Scientific Publishing Company - Amsterdam" and "Ultrafiltration at low degrees of concentration polarisation, technical possibilities" which appeared in "Desalination, 35 (1980) 115-118" (same publisher), the filtration apparatus comprises a cylindrical membrane rotating in a housing, the gap between the two being about 0.7 mm for a membrane 25 mm in diameter and 480 mm in length. Rotation of the membrane requires the use of a 1.8 kW motor, giving 47.4 kW/$m^2$ of membrane.

Because of the very small gaps between the membranes and their housings, all of the preceding devices present significant on the geometrical tolerances of their component parts; for the same reason, these devices are unsuitable both for filtering suspensions having large particles, and for filtering suspensions with a high proportion of dry matter. In addition, the liquid being churned may be subjected to excessive heating.

Finally, these devices consume considerable power, the power being wasted primarily in the rotating sealed passages.

The object of the present invention is to avoid these disadvantages, in other words to provide a tangential filtration apparatus which has no constraint on the size of the gap between the membrane and the housing, which has low power consumption, and which is both flexible and universally applicable with respect to the natures of the substances which can be filtered.

The present invention provides a tangential filtration apparatus comprising a housing containing a cylindrical filtration membrane, the filter layer constituting the outside face of said membrane, the membrane being rotatable about its axis by means of a drive system, said housing having an inlet orifice for supply of the unfiltered liquid and an outlet orifice for discharge of the residue.

It is characterized in particular by the following elements:

said housing is formed by a side wall sealed by bottom and top plates, said top plate supporting at least one drive system whose drive shaft passes in sealed manner through the plate;

said housing contains at least one cylindrical membrane whose length/diameter ratio is not less than, each end of the membrane being provided with a metal or ceramic plug, the top plug being secured directly to said shaft of the drive system; sealing between the residue compartment, outside the membrane, and the filtrate compartment, inside the membrane, being provided by a frictional conical seating between two ceramic parts, each located in one of said plugs, and two complementary ceramic parts secured to said top and bottom plates respectively; and said housing has an outlet orifice for the filtrate situated perpendicular to said bottom plug and coincident with openings formed in the two conical seated parts.

The distance between two membranes, or between one membrane and its housing, lies in the range of a few millimeters to a few centimeters, for example.

In a preferred embodiment, the material of said conical seated parts may be chosen from alumina, zirconia, silicon carbide, and silicon nitride.

Preferably, the top conical sealing part is connected to said top plate by means of a device for taking up slack.

Said membrane is capable of being rotated at a speed lying in the range 500 revolutions per minute (rpm) to 5000 rpm.

Said filter layer has a pore diameter lying in the range 0.2 $\mu$m to 15 $\mu$m.

In another implementation, said housing contains a plurality of membranes arranged parallel to one another, said bottom plate including ducts for collecting the filtrate into said outlet orifice provided in the housing.

In another variant implementation, said apparatus in accordance with the invention includes a plurality of housings each containing one membrane, the side wall of each housing being perforated, the assembly being arranged in a common container with a top plate supporting mechanical drive systems for the membranes and a bottom plate supporting the housings.

The apparatus according to the invention has a number of advantages. Firstly, the use of ceramic friction parts having both a mechanical function and a sealing function reduces the power consumption significantly. These parts having a very low coefficient of friction are very hard and wear-resistant.

Moreover, since Taylor vortices do not need to be formed, the membrane is not situated in close proximity to the housing. There is no close fit between the membranes, or between the membranes and their housing; the geometrical tolerances present few constraints and the spacing between the membranes is not very critical.

The volume of liquid which is churned is small since it is limited to the vicinity of the membrane. Since frictionally-generated heat is diffused throughout the liquid to be filtered, the heating effect is moderated, so the risk of the liquid being denatured is slight. This is particularly significant in biotechnology and in the food industry.

The apparatus of the invention allows suspensions having a high proportion of dry matter to be filtered, for example, yeast suspensions at 220 grams/liter. The apparatus also allows suspensions containing abrasive particles to be filtered since the centrifugal effect throws the particles away from the filtering surface.

The filtered particles may be large, for example a few millimeters across in the case of beet or vegetable fiber pulps.

The presence of a system for taking up slack allows a variation of between 0.4 mm and 0.8 mm in the vertical position of the drive-shaft with respect to the top plate as the temperature varies between −40° C. and +300° C., which compensates for the differential expansion of the ceramic and metal parts of the apparatus. The apparatus of the invention therefore withstands significant temperature variation, for example between the filtration periods and the cleaning periods.

Other characteristics and advantages of the present invention appear in the following description of various embodiments, the description to be read in conjunction with the accompanying drawings which are given by way of non-limiting example and in which:

FIG. 2 is a partial sectional view through a means for securing the membrane in the housing of the apparatus according to the invention;

FIG. 3 is a partly cutaway elevation view of the membrane which is partially visible in FIG. 2;

Figure 1:
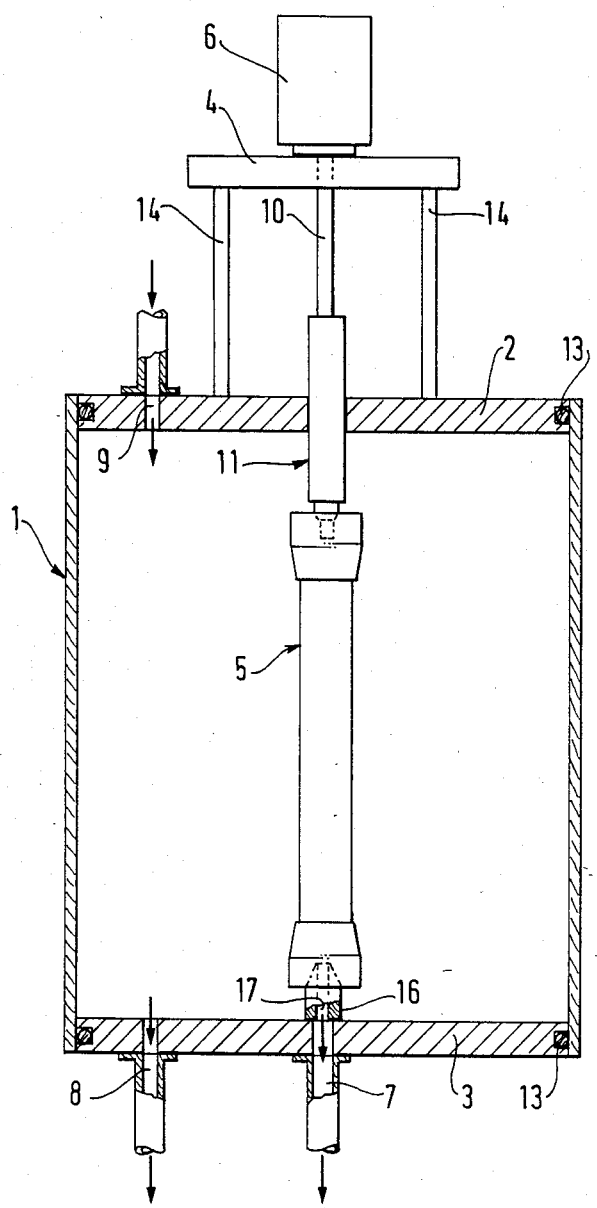
FIG. 1 shows very schematically a partial section through a filtration apparatus according to the invention, the apparatus having one membrane.

A single-membrane apparatus in according with the invention can be seen in FIG. 1. It consists of a housing 1 comprising a side wall which is closed at its top and bottom ends by two plates 2 and 3. Sealing between the housing and the plates 2 and 3 is ensured by seals 13. A plate 4, secured to plate 2 by rods 14, supports a motor 6 whose drive shaft is referenced 10. The filter membrane 5 is driven directly by shaft 10; a first sealing means 11 provided in plate 2 and a second sealing means provided in plate 3 are described in more detail further on. Plate 2 includes an orifice 9 for supplying the liquid to be filtered, and plate 3 includes an orifice 8 for discharging the residue and an orifice 7 for recovering the filtrate.

FIGS. 2 and 3 show in more detail both the membrane 5 and the sealing means 11 associated with it at the plate 2.

Membrane 5 (FIG. 3) comprises a porous ceramic tube 31 whose outside face has a filter layer 32 of controlled pore diameter. The length of membrane 5 is chosen to be not less than ten times its diameter. This is possible since, due to the properties of ceramic material, there is no risk of such a tubular membrane being deformed by buckling. For a given diameter, a larger available filter area can therefore be obtained. For given tangential speed, use of a smaller diameter increases radial acceleration, thereby increasing filtration efficiency, particularly in the case of cloudy suspensions.

The ends of membrane 5 are secured in two plugs 33 and 34 made of metal alloy or ceramics. The other ends of these plugs receive two ceramic parts or bushes 35 and 36, both of these parts having an axial cylindrical bore which is extended by a frustoconical bore opening to the exterior. These bushes are integral with plugs 33 and 34 respectively.

A sleeve 21 whose position is controlled by a screw 22 is secured to plate 2 by a lock nut 23. Sealing between the inside and the outside of the housing 1 is ensured by a seal 24. Sleeve 21 contains a piston 25 secured against rotation relative to the sleeve by a pin 28, the piston cooperating with an arrangement for taking up slack which comprises either resilient metal washers or a spring. Piston 25 has an aperture at its bottom end in which a ceramic part or bush 26 is secured, for example by any bonding means, the ceramic part or bush 26 cooperating by means of a conical seating with the rotating ceramic bush 35. The piston assembly includes an axial bore for the drive shaft 10.

Sealing at the plate 2 between the residue compartment outside the membrane and the filtrate compartment inside the membrane is therefore ensured by the friction between bushes 26 and 35. Similarly, sealing at plate 3 is ensured by the conical seating between bush 36 and a fixed bush 16 (visible in FIG. 1) which is integral with plate 3 and which has an orifice 17 for discharging the filtrate, which orifice coincides with orifice 7 in plate 3.

The two bushed couplings ensure that the rotating assembly is centered in the housing, and their use appreciably reduces the drive power.

By way of example, membrane 5 has a diameter of 19 mm and a length of 750 mm. The diameter of the pores in the filtration layer may vary between 0.2 $\mu$m and 15 $\mu$m. Housing 1 has a diameter of 45 mm. The drive speed of the membrane lies in the range 500 rpm to 5000 rpm.

At 500 rpm, the power consumption is about 0.2 kW/m$^2$; at 3000 rpm it is between 0.2 kW/m$^2$ and 0.3 kW/m$^2$; at 500 rpm, it is between 0.3 kW/m$^2$ and 0.6 kW/m$^2$. It can therefore be seen that the drive and sealing system, and also the form of the membrane, contribute to a very significant reduction in the power consumption of the apparatus.

Figure 4:
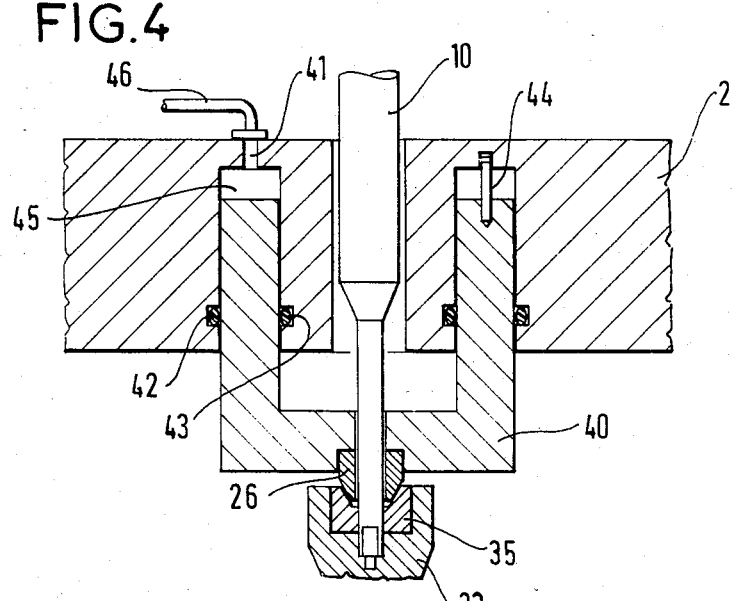
FIG. 4 shows schematically a variation on the arrangement for taking up slack which is visible in FIG. 2.

FIG. 2 shows an arrangement for taking up slack which is constituted by two resilient stainless steel washers with an intermediate washer of a rigid material. Such an arrangement is intended to compensate for any differences in expansion which may appear between the ceramic parts and the metal parts of the apparatus, in the event of temperature variations. FIG. 4 shows a variation on this arrangement.

The top plate 2 is machined so as to receive a sliding ring 40 in which the fixed bush 26 is secured, which bush provides a contact seal with the rotating bush 35; ring 40 is secured against rotation relative to plate 2 by a pin 44. An orifice 41 which is formed in plate 2 and extended by a capillary tube 46 connected to a regulated pressure source (for example, a sealed tank, not shown) allows a pressure P1 to be maintained in the volume 45 above the ring 40. Seals 42 and 43 ensure sealing between plate 2 and ring 40. The bottom end of ring 40 lies in the filtration chamber which is at pressure P2. To ensure a sufficient and constant pressure between bushes 26 and 35 despite differential expansion, pressure P1 must always be greater than pressure P2; P1 is adjusted so that the pressure exerted on the bushes is about 1 bar.

Figure 5:
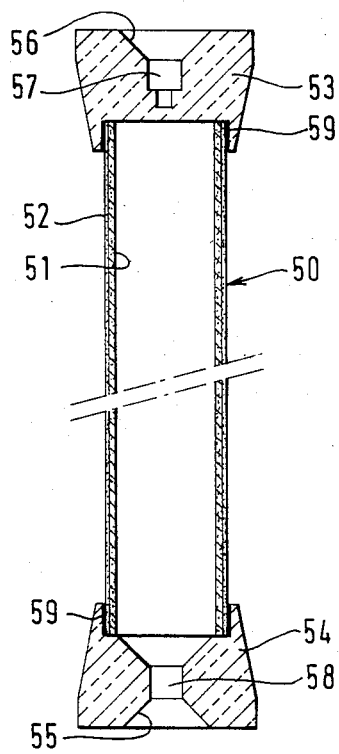
FIG. 5 shows schematically a section through a variant of the membrane visible in FIG. 3.

A variant 50 of the membrane construction is shown in FIG. 5. It has a unitary ceramic structure including two ceramic plugs 53 and 54 and a porous tubular part 51 whose outside surface has a filtration layer 52 which is also made of ceramic, with pores of controlled diameter. Plug 53 is machined at 56 to correspond to the contact surface with the fixed bush 26, and at 57 to receive shaft 10. Plug 54 is machined at 55 to correspond to the contact surface with the fixed bush 16 and at 58 to correspond to the filtrate discharge orifice. The plugs and the tubular part may be secured together, either by assembling and co-sintering the raw parts or by glass sealing 59 on the sintered parts. As before, sealing between the compartments is assured by contact between the surfaces 56 and 55 and the fixed bushes 26 and 16 respectively.

Figure 6:
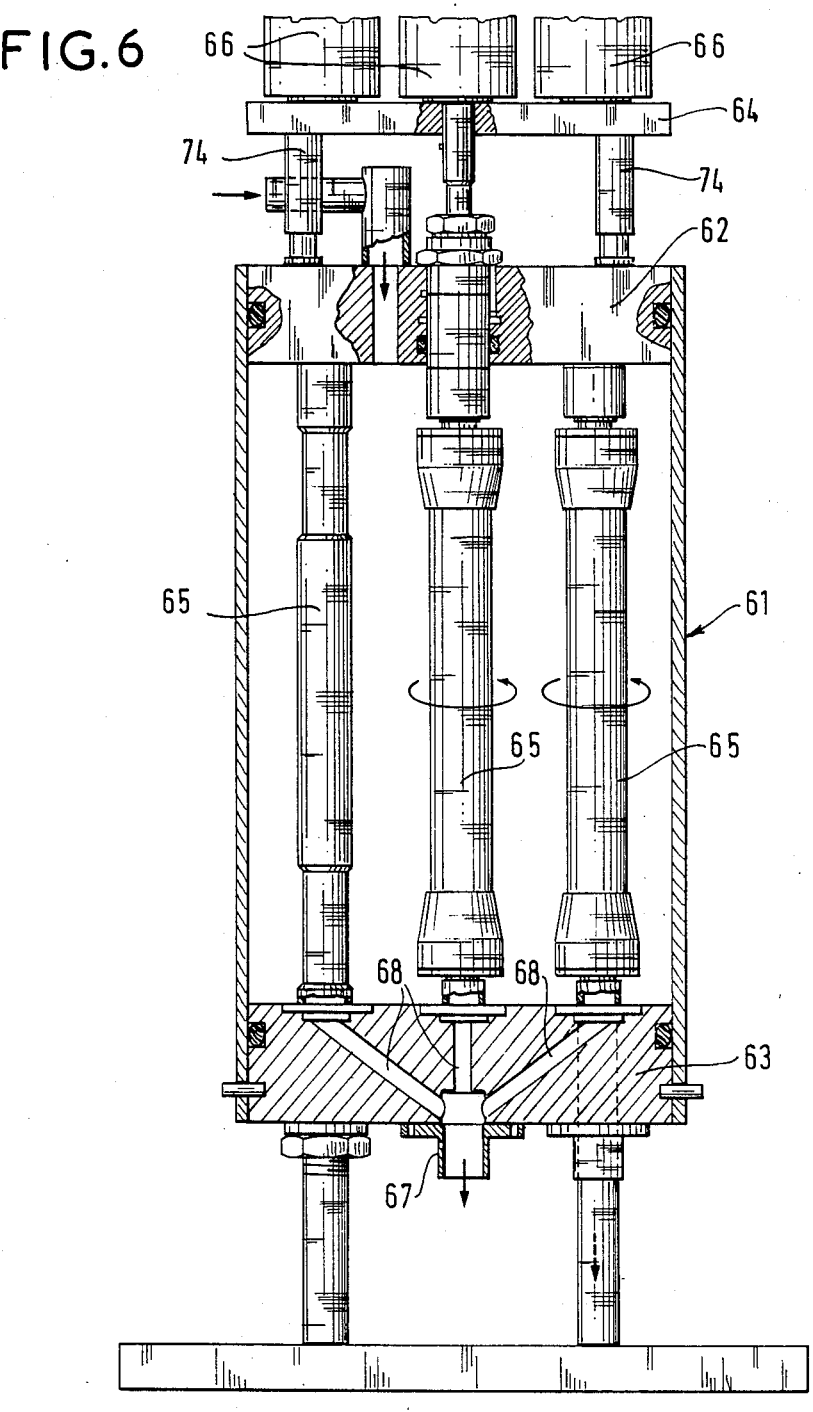
FIG. 6 shows an apparatus according to the invention in which the housing contains several membranes.

FIG. 6 shows a housing 61 containing a plurality of rotating membranes, the assembly having low power consumption. Housing 61 is closed by two plates 62 and 63 which are connected by means of rods 65. Plate 64, secured to plate 62 by rods 74, serves as a support for motors 66. As in the apparatus of FIGS. 1 to 3, each motor 66 is associated with a filter membrane 65. Preferably, the different membranes rotate in the same direction; if not, there would be a tendency to form stable boundary layers around each membrane. Plate 63 has a system 68 for collecting the various filtrates from the membranes 65 into an orifice 67.

By way of example, housing 67 has an internal diameter of 126 mm and contains 7 membranes which are 19 mm in diameter and 750 mm in length. A housing containing 19 membranes has a diameter of 250 mm.

With the 7 membranes previously described, it is possible to filter water or yeast suspensions at speeds in the range 500 rpm to 4000 rpm. The throughput obtained, which varies according to the type of liquid, lies in the range 0.2 m$^3$/h/m$^2$ to 1.0 m$^3$/h/m$^2$ for water and in the range 0.2 m$^3$/h/m$^2$ to 0.5 m$^3$/h/m$^2$ for yeast suspensions.

Figure 7:
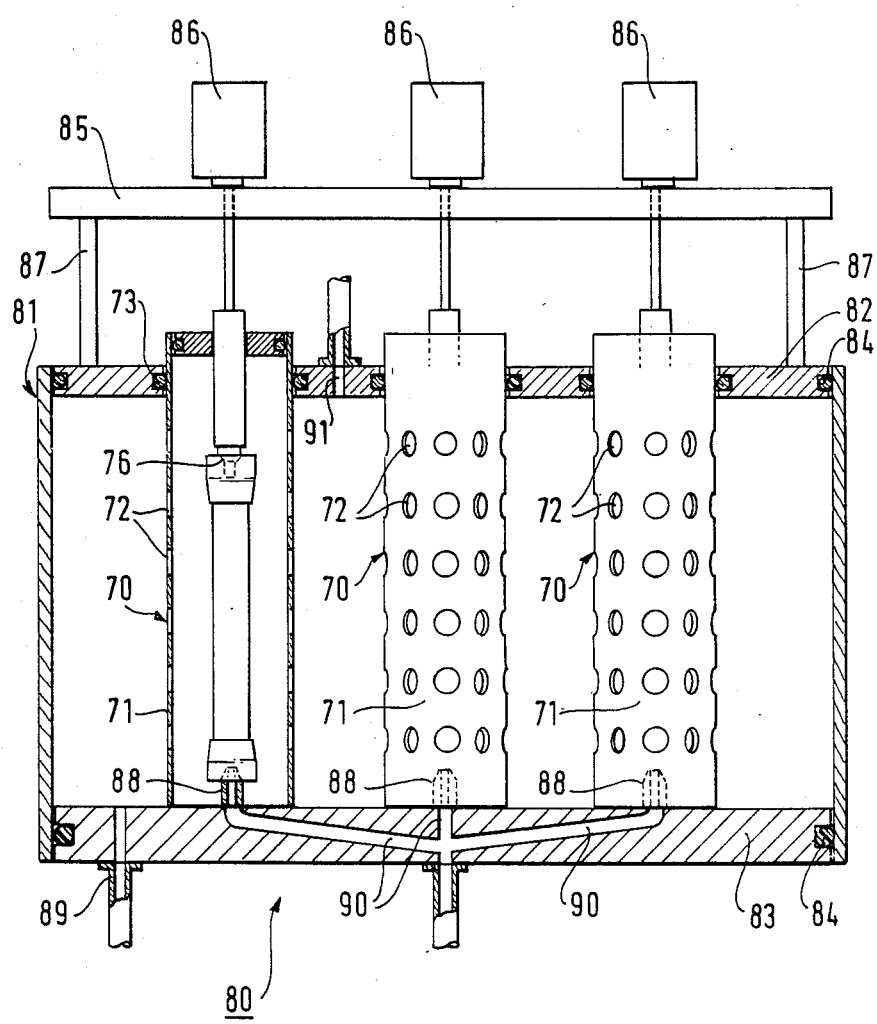
FIG. 7 shows schematically a partial section through a variant of the apparatus according to the invention.

FIG. 7 is a diagram of a multi-tube arrangement 80 comprising a group of several single tube devices 70. Each single tube device is identical to that shown in FIGS. 1 to 3 except that its housing 71 is pierced by holes 72 over almost its entire height. Sealing between plate 82 and housings 71 is ensured by seals 73. The multi-tube arrangement 80 itself includes two plates 82 and 83 which are secured to a housing 81 by means of seals 84; a plate 85, secured to plate 82 by rods 87, receives the motors 86 associated with each single tube device 70. Plate 83 receives the fixed ceramic bushes 88 and includes a collection system 90 for the various filtrates as well as an orifice for discharging the residue. Plate 82 has an orifice 91 for supplying the unfiltered liquid. Sealing between the residue compartment outside the ceramic membranes and the filtrate compartment inside the membranes is ensured by contact between the fixed ceramic bushes 76 and 88 and the rotating ceramic bushes inside the single tube devices.

The invention is not limited to the various embodiments given by way of example. Any of the means described may be replaced by equivalent means without going beyond the scope of the invention.

We claim:

1. Tangential filtration apparatus comprising a housing containing a cylindrical filtration membrane, the filter layer constituting the outside face of said membrane, the membrane being rotatable about its axis by a drive system, said housing having an inlet orifice for supply of the unfiltered liquid and an outlet orifice for discharge of the residue, including means for filtering suspensions with a high proportion of large particles and for filtering suspensions having a high proportion of dry material and including, that said housing is formed by a side wall sealed by bottom and top plates, said top plate supporting at least one drive system whose drive shaft passes in sealed manner through the plate;

that said housing contains at least one cylindrical membrane, whose length/diameter ratio of which is not less than 10, each end of which is provided with a metal or ceramic plug, the top plug being secured directly to said shaft of the drive system, sealing between the residue compartment outside the membrane and the filtrate compartment inside the membrane being provided by a frictional conical seating between two ceramic parts, each located in one of said plugs and two complementary ceramic parts secured to said top plate and bottom plates respectively; and that said housing has an outlet orifice for the filtrate situated perpendicular to said bottom plug and coincident with openings formed in the two conical seated parts.

2. Tangential filtration apparatus according to claim 1, characterized by the fact that the distance between two membranes, or between one membrane and its housing, lies in the range of a few millimeters to a few centimeters.

3. Tangential filtration apparatus according to claim 1, characterized by the fact that the material of said conical seated parts is chosen from alumina, zirconia, silicon carbide and silicon nitride.

4. Tangential filtration apparatus according to any one of claims 1 to 3, characterized by the fact that the top ceramic conical sealing part is connected to said top plate by means of a device for taking up slack.

5. Tangential filtration apparatus according to any one preceding claim, characterized by the fact that said membrane is capable of being rotated at a speed lying in the range 500 rpm to 5000 rpm.

6. Tangential filtration apparatus according to any one preceding claim, characterized by the fact that said filter layer has a pore diameter lying in the range 0.2 μm to 15 μm.

7. Tangential filtration apparatus according to any one of claims 1 to 6, characterized by the fact that it includes a plurality of housings each containing one membrane, the side wall of each housing being perforated, the assembly being arranged in a common container having a top plate to support the mechanical drive systems for the membranes and a bottom plate supporting the housings and having ducts for collecting the filtrate.

8. Tangential filtration apparatus according to any one preceding claim, characterized by the fact that said housing contains a plurality of membranes arranged parallel to one another, said bottom plate including ducts for collecting the filtrate into said outlet orifice provided in said housing.

* * * * *